United States Patent
Shumaker et al.

(10) Patent No.: US 10,343,618 B2
(45) Date of Patent: Jul. 9, 2019

(54) LANDSCAPING BLOWER NOZZLE ASSEMBLY

(71) Applicant: Porta Maker, Inc., Grand Rapids, MI (US)

(72) Inventors: Kristopher D. Shumaker, Holland, MI (US); Jeremy C. Stoddard, Holland, MI (US); Steven J. Leibrandt, Muskegon, MI (US)

(73) Assignee: Portamaker, Inc., Grand Rapids, MI (US)

(*) Notice: Subject to any disclaimer, the term of this patent is extended or adjusted under 35 U.S.C. 154(b) by 408 days.

(21) Appl. No.: 15/341,863

(22) Filed: Nov. 2, 2016

(65) Prior Publication Data

US 2017/0112071 A1   Apr. 27, 2017

Related U.S. Application Data

(63) Continuation-in-part of application No. 14/920,461, filed on Oct. 22, 2015, now Pat. No. 9,510,516.

(60) Provisional application No. 62/067,138, filed on Oct. 22, 2014.

(51) Int. Cl.
| | |
|---|---|
| *B60R 11/00* | (2006.01) |
| *E01H 1/08* | (2006.01) |
| *A01G 20/47* | (2018.01) |
| *A47L 5/14* | (2006.01) |

(52) U.S. Cl.
CPC ............ *B60R 11/00* (2013.01); *A01G 20/47* (2018.02); *E01H 1/0809* (2013.01); *A47L 5/14* (2013.01); *B60R 2011/004* (2013.01)

(58) Field of Classification Search
CPC ......... E01H 1/0809; E01H 1/08; B60R 11/00; B60R 2011/004; A47L 5/14; A01G 20/47
USPC ...................................... 15/327.5, 344, 405
See application file for complete search history.

(56) References Cited

U.S. PATENT DOCUMENTS

| | | |
|---|---|---|
| 1,981,099 A | 11/1934 | Fender |
| 2,561,882 A | 7/1951 | Patton |
| 3,808,632 A | 5/1974 | Aagesen |
| 4,023,286 A | 5/1977 | Wickware et al. |
| 4,549,365 A | 10/1985 | Johnson |
| 5,479,730 A | 1/1996 | Gogan |
| 6,073,305 A | 6/2000 | Hesskamp |
| 6,178,668 B1 | 1/2001 | Gustafson et al. |
| 6,226,833 B1 | 5/2001 | Kawaguchi |
| 6,735,814 B2 | 5/2004 | Franklin et al. |
| 7,240,891 B2 | 7/2007 | Hafendorfer |
| 7,712,232 B2 | 5/2010 | Majkrzak |
| 8,220,849 B2 | 7/2012 | Beaird, III et al. |
| 8,387,205 B2 | 3/2013 | Weihl et al. |
| 8,579,058 B1 | 11/2013 | Yamada et al. |

(Continued)

*Primary Examiner* — David Redding
(74) *Attorney, Agent, or Firm* — Frank M. Scutch, III (57) ABSTRACT

A landscaping blower nozzle assembly includes an inlet section for allowing air into the assembly, an elbow section and a motor. A nozzle is insertable into the elbow section such that the motor moves the elbow section in a moveable motion back and forth though at least 180 degree of motion for aiding the operator in the movement and removal of leaves and other debris. A breakaway coupler prevents damage to the blower nozzle when coming into contact with a rigid surface or structure. A tensioner assembly prevents distortion of the nozzle tip when subjected to high velocity air from the blower motor.

19 Claims, 14 Drawing Sheets

(56) References Cited

U.S. PATENT DOCUMENTS

2003/0228218 A1* 12/2003 Metz .................... F04D 29/441
                                                    415/206
2015/0237808 A1    8/2015 Prager

* cited by examiner

LANDSCAPING BLOWER NOZZLE ASSEMBLY

FIELD OF THE INVENTION

The invention relates to the field of lawn and ground maintenance and more particularly to a moveable nozzle used with a leaf and debris blower assembly.

BACKGROUND OF THE INVENTION

Leaf and debris blowers are well known in the art and work as powered tools that propel air out of a nozzle. These tools are typically used to move yard debris such as leaves or lawn debris. Leaf blowers are most often powered by either electric or gasoline motors. Moreover, leaf blowers are typically self-contained handheld units, or backpack mounted units that use a handheld wand. The latter is more ergonomic for prolonged use. Larger units may rest on wheels and even use a motor for propulsion. These are sometimes called "walk behind leaf blowers" because they must be pushed by hand to be operated. Some units can also be towed behind a vehicle and may be difficult to operate due to their distance from the operator.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to a moveable nozzle assembly. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 to FIG. 6 illustrate various views of the moveable nozzle assembly that can be used with ground maintenance machines such as a blower assembly. With regard to FIG. 1 to FIG. 6, the moveable nozzle assembly 100 includes a flexible elbow 103, having air exhaust nozzle 107 attached to the distal end thereof. The elbow 103 gradually bends through approximately 90 degrees and is manufactured of a moldable, pliable rubber or vinyl material so to allow the elbow 103 to easily flex, move and/or bend while in use. This might occur while the blower assembly is in motion and the elbow was to come into contact with either the ground or objects on the ground coming into contact with the exhaust nozzle 107. The flexibility of the elbow 103 allows, at least the distal portion, to retain its shape so to snap back into a fixed position after any forces from bending are removed.

Figures 1, 1A:
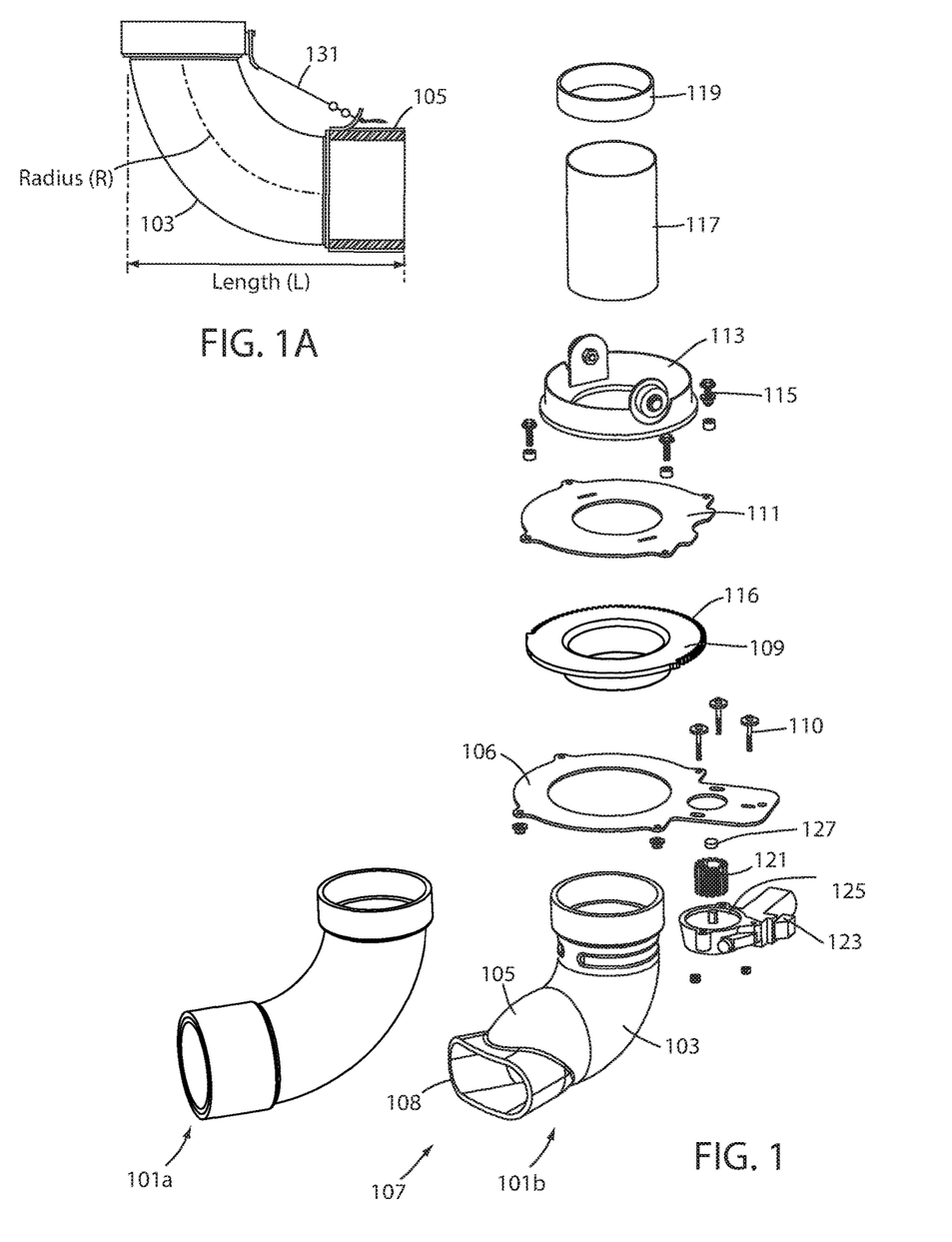
FIG. 1 is an exploded view illustrating the components of the moveable nozzle assembly shown in FIG. 1.
FIG. 1A is a side view of the moveable nozzle showing a tensioning cable.
Figure 2:
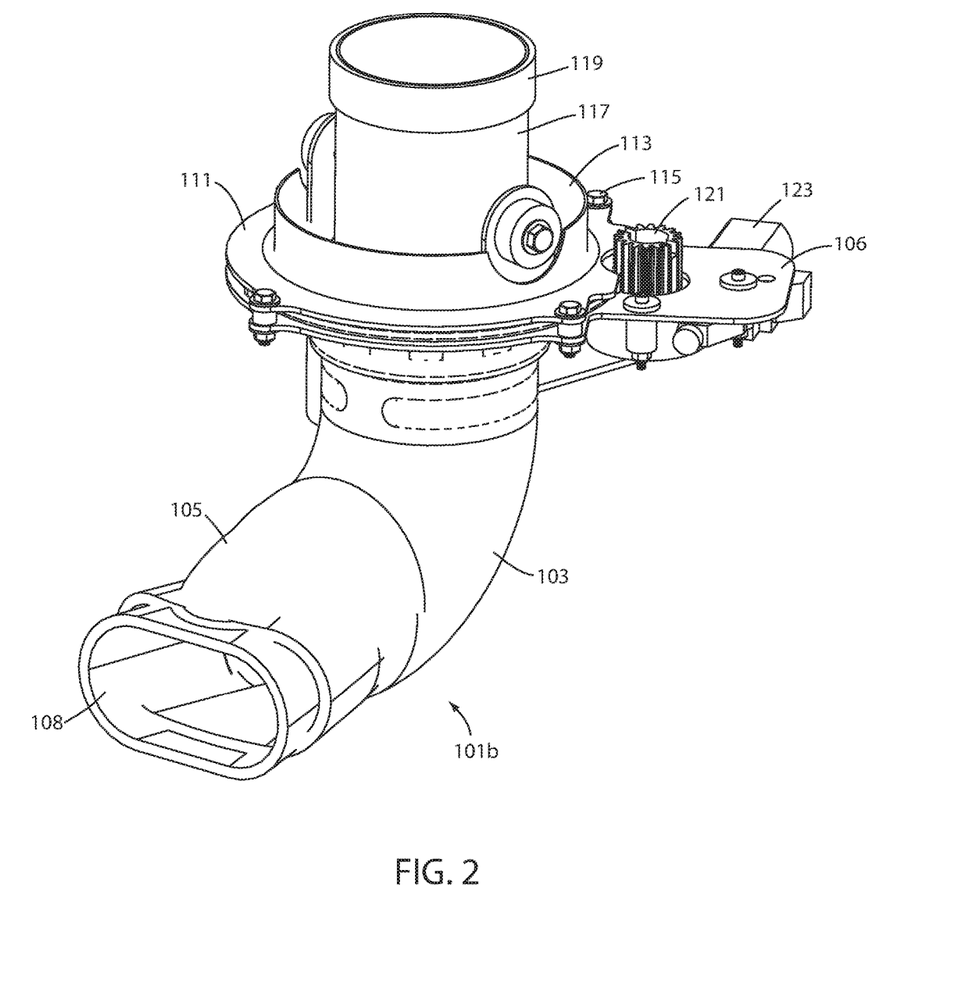
FIG. 2 is a side perspective view of moveable nozzle assembly according to an embodiment of the invention.
Figure 3:
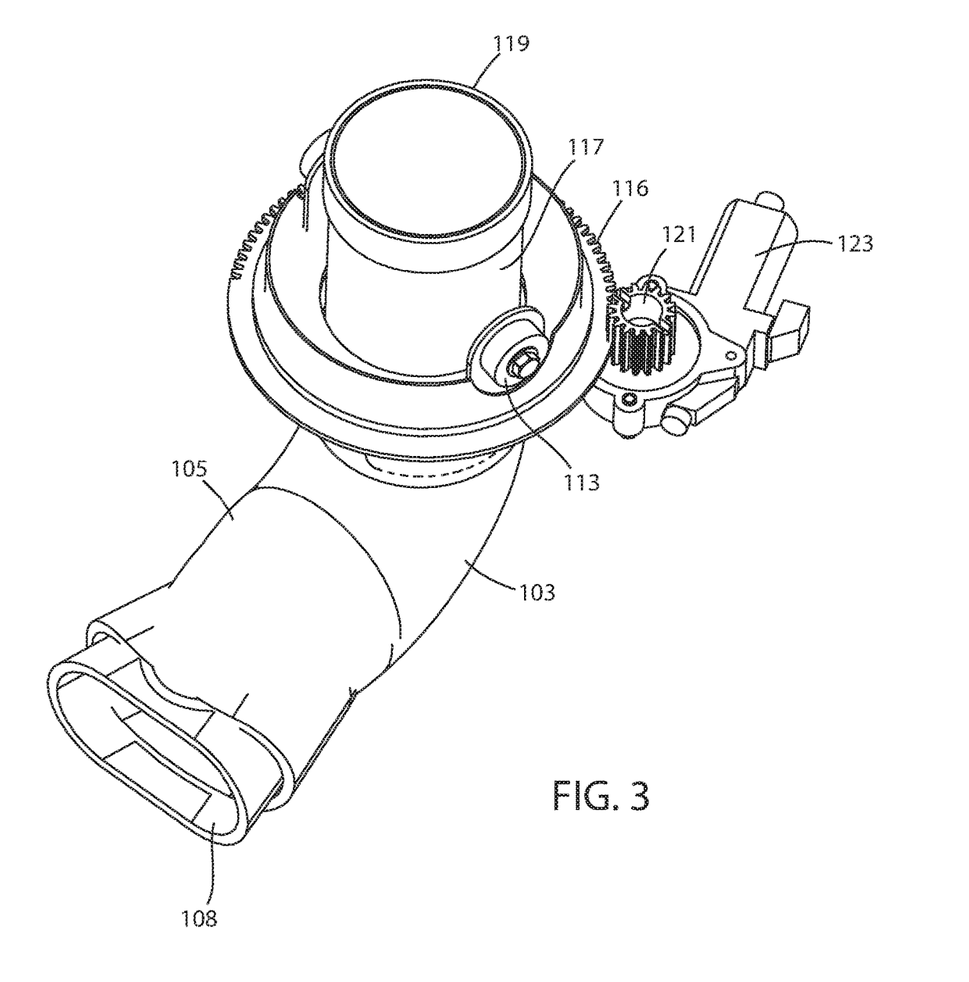
FIG. 3 is a top perspective view of the moveable nozzle assembly.
Figure 4:
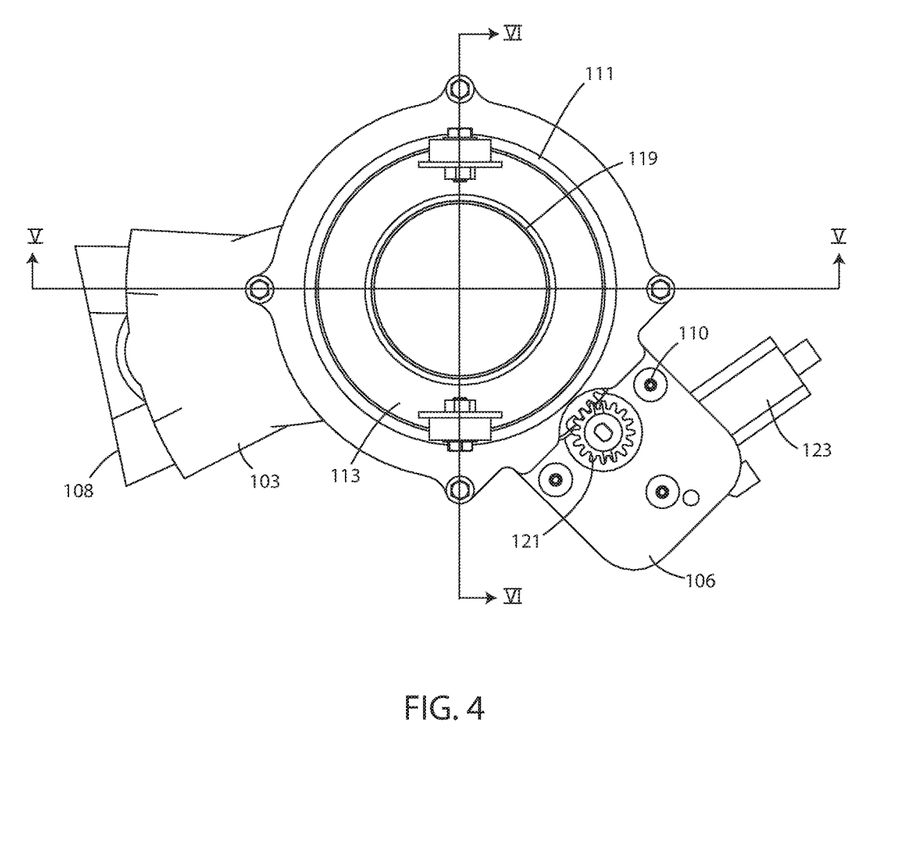
FIG. 4 is top view of the moveable nozzle assembly.
Figure 5:
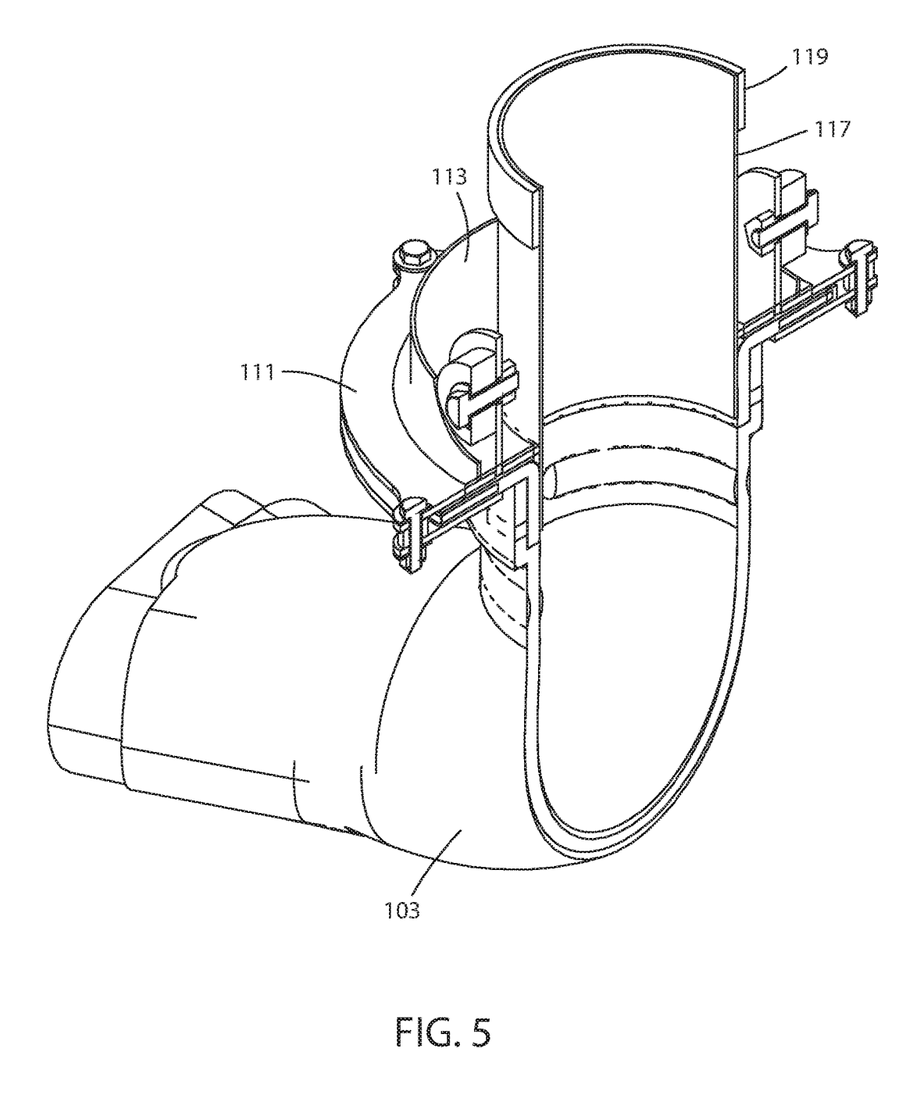
FIG. 5 is cross-sectional view shown through lines V-V of FIG. 4.
Figure 6:
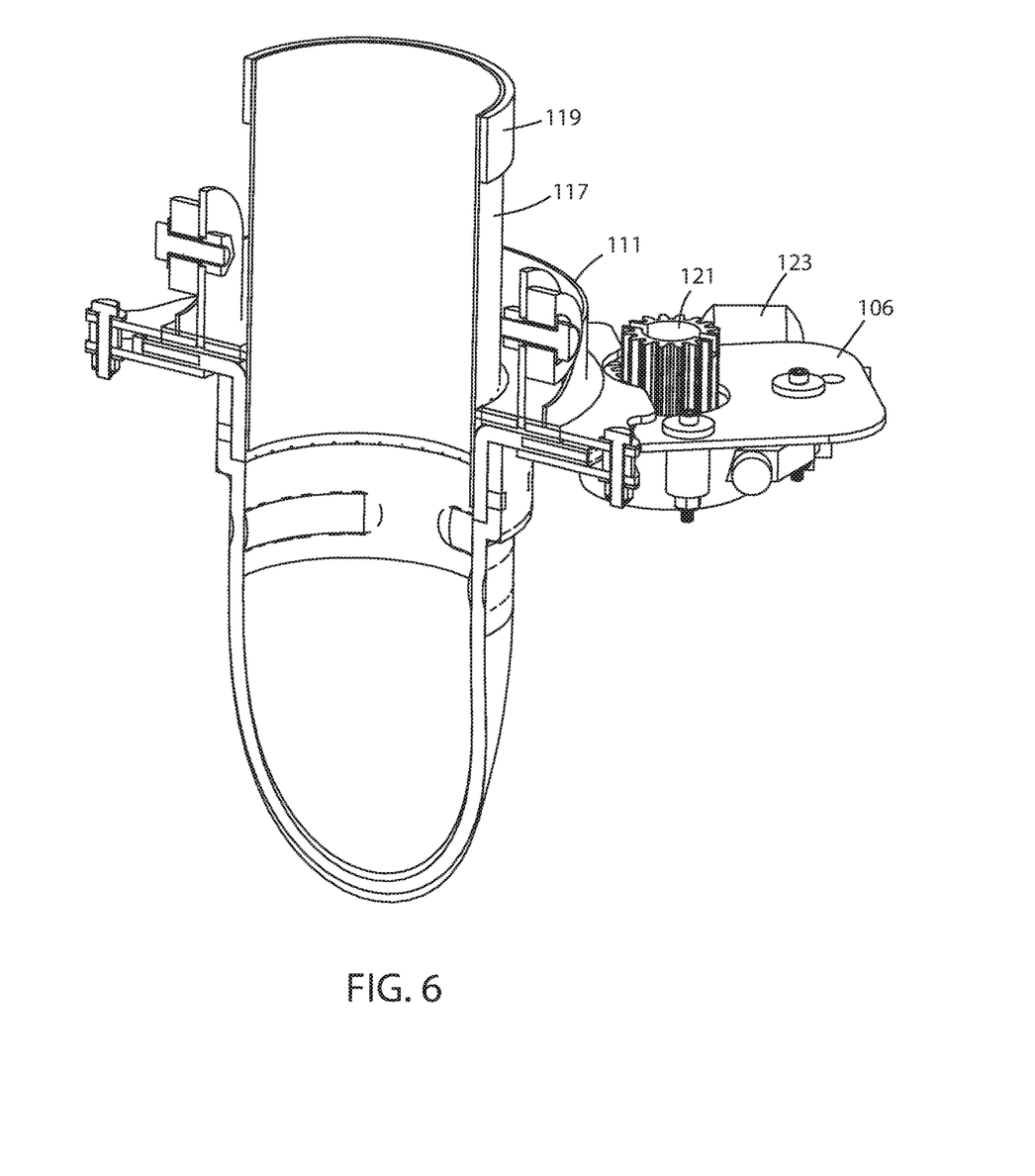
FIG. 6 is cross-sectional view shown through lines VI-VI of FIG. 4.

As seen in FIG. 1, the exhaust nozzle 107 is shown in two embodiments namely outlet 101a and outlet 101b. The outlet 101a has a round exhaust end while the alternative outlet 101b has a narrow exhaust end. Those skilled in the art will recognize differing types or shapes are exhaust nozzles are possible. The elbow 103 may be slightly enlarged at its lower portion 105 to provide a cavity for a hardened insert 108. The hardened insert 108 is used to maintain its rigidity and shape as air, moving at a high velocity, exits the nozzle tip. Hence, the nozzle 107 can also be used in combination with the removable insert depending on application. Those skilled in the art will also recognize that the insert 108 has a predetermined narrowed shape and is made of a rigid material used for preventing the nozzle 107 from changing overall configuration and shape during use. Preferably, the overall shape of the nozzle 107 and insert 108 should remain constant during use, regardless of the airflow forces, so as the highest degree of linear air flow can be achieved through the nozzle.

Further, the proximal end of elbow 103 is used with an elbow plate 106. The elbow plate 106 is generally circular in shape and includes apertures around its perimeter for use with screws and/or other fasteners 110. The fasteners 110 hold the elbow plate 106 to a supporting surface. The elbow plate 106 works to join and/or seal an upper tube 117 and seal 119 to a corresponding joining section of the elbow ring gear 116. The ring gear 116 can be formed either as a one or two piece assembly and includes a top toothed gear and a bottom attachment sleeve 109 that fits within the elbow plate 106. In use, the upper tube 117 is a sealed tube that channels the exhaust air exiting directly from an associated blower motor and/or propeller assembly (not shown). Included between the elbow plate 106 and elbow 103 is a gear 116. The gear 116 is generally flat in shape and includes teeth along its outer circumference that mesh with a pinion 121. The gear 116 includes stops at both ends of the gear teeth for permitting the gear 116 to move only in a predetermined angular range. For example, the gear 116 may be set to move in an arcuate range of 0 to 200 degrees relative to a point forward of the blower. Further, the pinion 121 is a cylindrical gear that is vertically mounted within channel 125 and mechanically connected to rotation motor 123. The channel 125 is integrally formed within the elbow plate 106. The rotation motor 123 is typically a small 12 volt DC motor that operates to precisely rotate the pinion 121 in either direction from a center position. As seen in FIG. 1, pinion 121 is positioned on top of the motor 123 within a round channel 125 to keep it into a fixed position.

In use, the motor 123 rotates the pinion 121, which in-turn controls movement of the gear 116 as the teeth of the pinion 121 and the teeth of gear 116 are mechanically meshed together in juxtaposition. Since the gear 116 is attached to the elbow 103, the movement of the gear 115 causes the nozzle 107 to move in a horizontal motion or arc, in relation to the ground. The range of motion is at least 180 degrees or more but less than 360 degrees. Thus, when the blower assembly 100 is placed on a vehicle, this allows great versatility where the exhaust airflow can be easily changed depending on conditions of the blower or user requirements. This movement can optionally be set up to provide movement in a predetermined arc of motion while exhaust air blows across the ground. Further, in order to show position of the exhaust nozzle 107, FIG. 1 illustrates a potentiometer 127 that is attached to the top of pinion 121. In use, the pinion 121 rotates a wiper in the potentiometer 127 to some resistance value. This resistance value is then measured using an electric comparator or like device. This value is then correlated to a position of the exhaust nozzle relative to the ground or the vehicle body. The position of the exhaust nozzle 107 can then be communicated to a display device for visual use by the operator.

As seen in FIG. 1A, a tensioning cable 131 is connected to the tip of the top portion of the elbow 103 for preventing the elbow 103 from extending and/or straightening downwardly toward the ground. Since any downward extension would impede and/or alter the intended direction of airflow, the tensioner prevents such movement. In use, the tensioning cable can be manually adjusted or controlled by an actuator, lanyard or cable to allow the nozzle 107 to reciprocate upwardly or downwardly relative to the ground. Hence As seen in FIG. 1A, there are at least four components to the air exhaust nozzle 107 that make it unique to a landscaping blower assembly namely; 1) the radius of the elbow 103; 2) the length of the elbow's straight lower portion 105; 3) the hardness and elastic modulus of the elbow material; and 4) the use of tensioning cable 131. All of these features working in combination to allow the exhaust nozzle 107 to perform in a novel and unique way as compared to the prior art. Those skilled in the art will also recognize that the radius of the elbow 103 is specially selected with a gradual bend for allowing the airflow to bend at approximately 90 degrees with minimal turbulence. This gradual bend allows the force of the air from the blower to be maintained at a substantially high level without a reduction in forces that would occur from a tight or abrupt bend in the nozzle.

Figure 7:
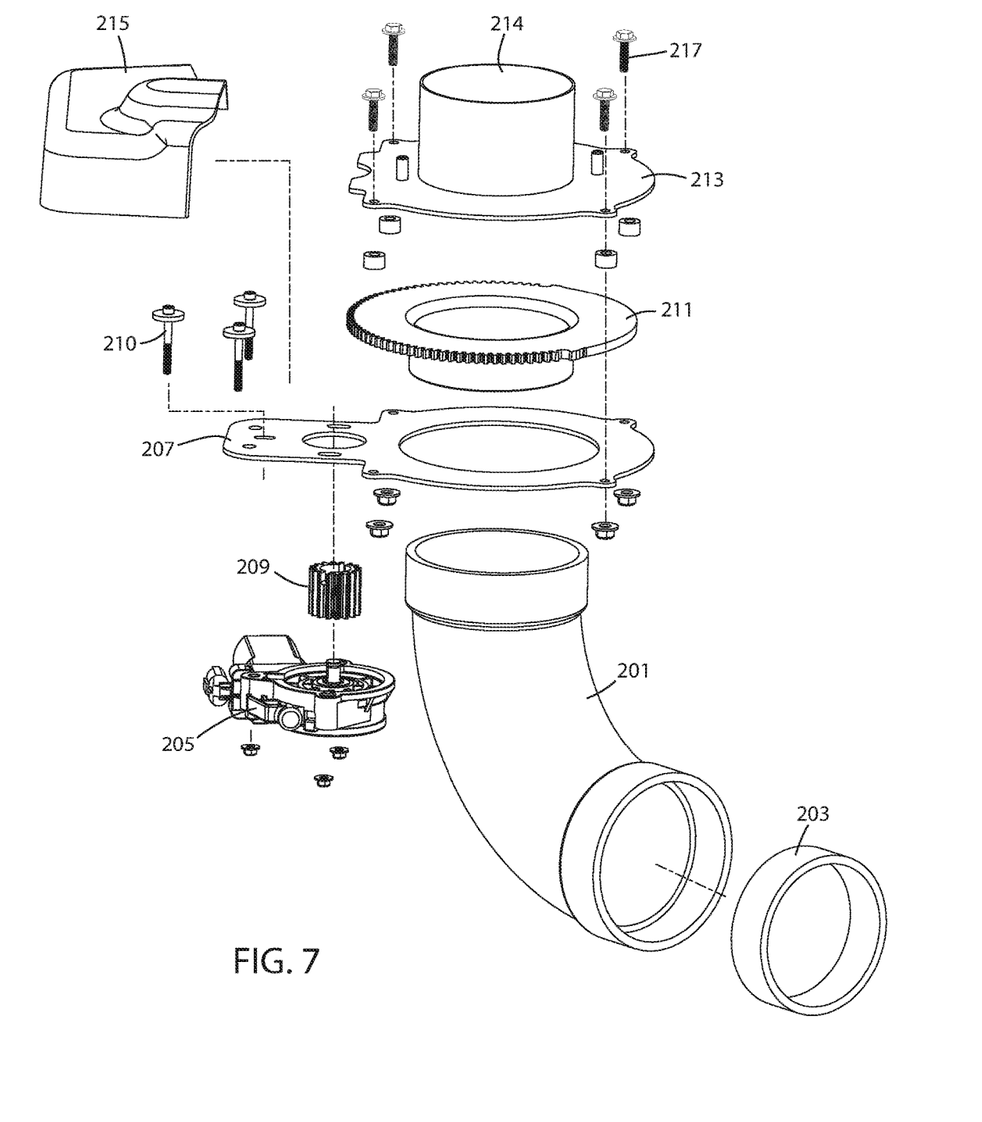
FIG. 7 is an exploded view illustrating the components of a second embodiment of the moveable nozzle assembly.
Figure 8:
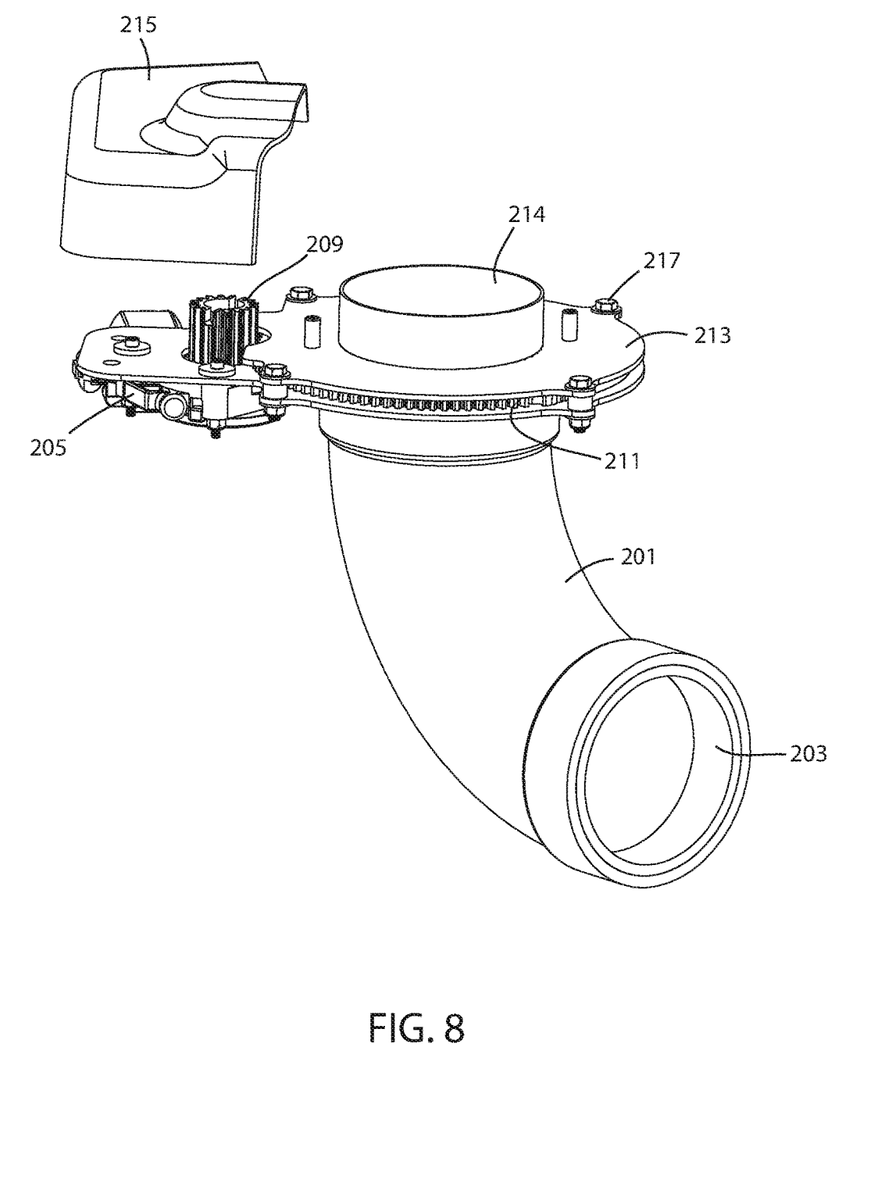
FIG. 8 is an exploded view illustrating the components of a second embodiment of the moveable nozzle.

FIG. 7 is an exploded view illustrating the components of a second embodiment of the moveable nozzle assembly. FIG. 8 is a side perspective view of the moveable nozzle assembly as shown in FIG. 7. With regard to both FIG. 7 and FIG. 8, the moveable nozzle assembly 200 includes a 90-degree elbow 201 and a rigid tip insert 203. As described herein, the 90-degree elbow 201 works to direct air from a blower motor though a 90 degree turn with minimal attenuation of the air velocity. The rigid tip insert 203 works to prevent the distal end of the elbow 201 from deforming during high velocity air flow. Moreover, it also prevents deformation of the 90-degree elbow 201 when if it comes into contact with the ground. As seen in FIG. 7, the rigid tip insert 203 fits within a enlarged area of the 90 degree elbow insert 201 which has a greater circular diameter at its distal end. Although shown as a elbow that is circular in cross-section, those skilled in the art will recognize that other nozzle shapes and configurations are also possible. In one alternative embodiment, a removable and replaceable nozzle can be inserted into the 90-degree elbow 201. Moreover, a user controllable baffle can be used inside the nozzle to control the air speed velocity from the blower motor. Further, nozzle extensions can be used to adjust overall nozzle position or length relative to the ground.

Further, the moveable nozzle assembly 200 includes a rotation motor 205. The rotation motor 205 is low voltage DC motor that is configured using a lower mount 207 such that the motor rotation motor 205 is mounted to the lower mount 207. The rotation motor 205 is configured so to operate with a pinion 209 the mounts to the shaft of the rotation motor 205. The pinion 209 mounts vertically, in relation to the lower mount 207, and is cylindrically shaped having teeth around its circumference. The pinion 209 engages with a gear 211 to rotate the gear 211 in an arc motion in either direction from a center position. The gear 211 is substantially flat in shape and includes a plurality of teeth around its perimeter. A stop is located at a predetermined position on each end of the stop to define a range of motion for the gear. For example, the range of motion may be a range from 0 to 235 degrees allowing the 90-degree elbow to rotate in this motion allowing high velocity air to be directed both in front and to the sides of the blower motor (not shown). Those skilled in the art will further recognize that the motor 205 can be actuated either manually by the operator or through an automated type control so the elbow 201 can move back and forth automatically. Further, covers an/or shrouds positioned over the blower motor can be made removable for operator cleaning and maintenance.

In order to mount and control the gear 211, an upper mount weldment 213 is used in combination with a tube 214. At one end, the tube 214 engages within a hole within the weldment 213 and is sized so that it outer diameter fits within the proximal end of elbow 201. At its opposite end, it engages with the blower housing (not shown). The upper mount weldment 213 is also used to hold the gear 211, lower mount 217 and elbow 201 together in compression so that the elbow 201 may move in a horizontal rotational motion relative to the ground. Finally, a cover 215 works to cover the pinion 209 and gear 211 preventing debris or other foreign objects from damaging these components. As best seen in FIG. 8, the upper mount weldment 213 will securely hold the lower mount 20, gear 211 and the upper mount weldment 213 together with one or more screws 217.

Figure 9:
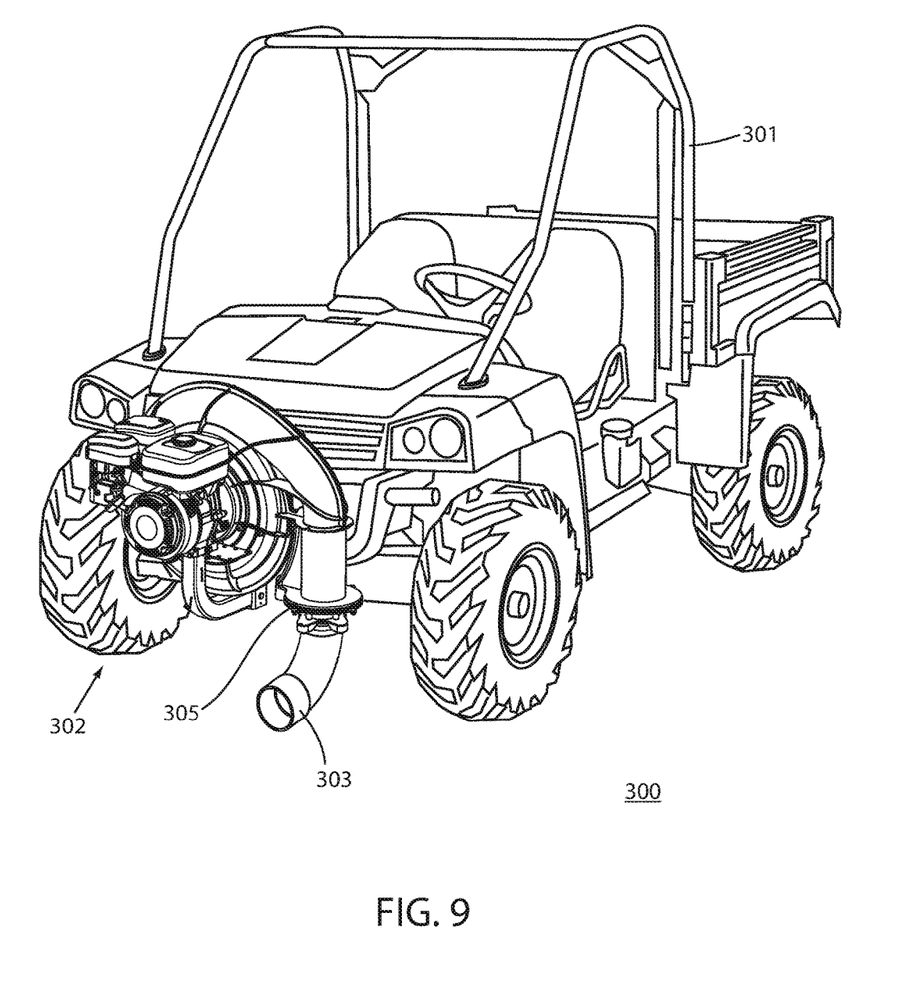
FIG. 9 is a perspective view of a blower assembly attached to a utility vehicle.
Figure 10:
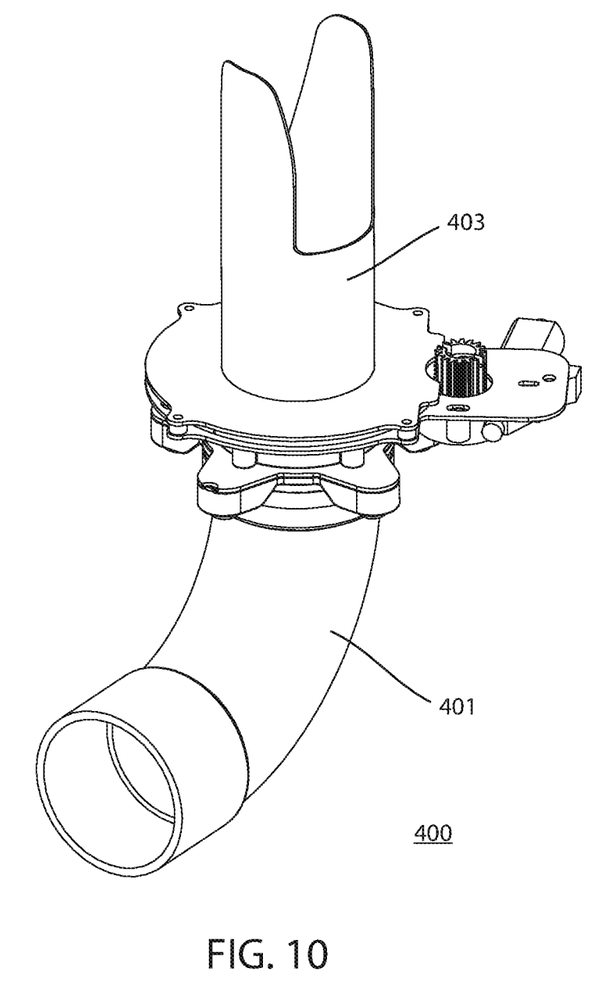
FIG. 10 is a perspective view showing a breakaway coupling assembly in accordance with another embodiment of the invention.

FIG. 9 is a perspective view illustrating a blower assembly as described herein attached to the front of a utility vehicle. Those skilled in the art will recognize that many different types of self-propelled utility vehicles can be used including all-terrain vehicles (ATVs) and lawn care machines such as mowers, spreaders. As seen in FIG. 10, the blower assembly 300 may be mounted to the front bumper of the utility vehicle 301 where the motor 302 faces forward. An elbow 303 can be moved by the operator to direct the blowing air at various angles forward of the vehicle. As described herein, a breakaway coupling assembly 305 operates to release the elbow 303 in the event the elbow strikes a rigid surface to prevent damage to the elbow.

FIG. 10 is a perspective view showing a breakaway nozzle coupling assembly in accordance with another embodiment of the invention. The breakaway nozzle coupling assembly 400 allows the elbow 401 and nozzle to be easily disconnected when a predetermined amount of force is applied against or to the side of the elbow 401. This might occur when the blower is in motion and contacts a fixed object directly ahead of the elbow 401. For example, if the elbow 401 where moving across the ground and encountered a steep incline. In this instance, the elbow 401 could contact the ground. Similarly, if the elbow were to hit a curb on the side of a paved street. Those skilled in the art will recognize that the breakaway coupling assembly prevents the elbow and nozzle from being damaged from forces that may occur if the elbow 401 were in a fixed, rigid and non-releasable contact with the inlet tube 403. In use, if the amount of force exceeds the forces required to maintain an adhesive bond, the elbow and nozzle tip will release and break free from the tube 403 that supplies air from the blower into the elbow 401.

Figure 11:
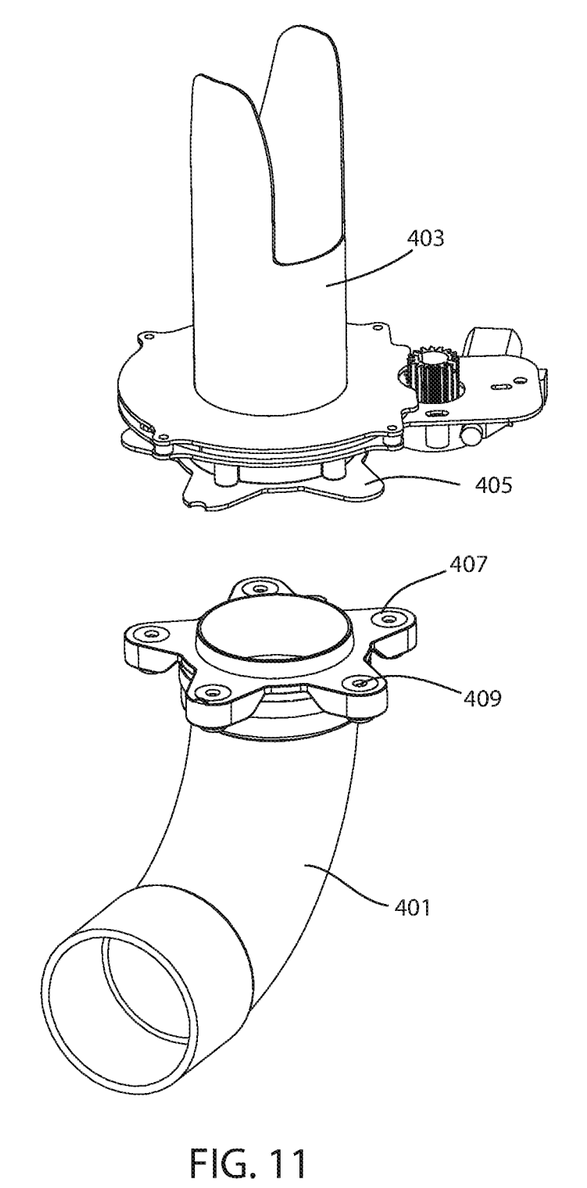
FIG. 11 is a perspective view of the breakaway coupling assembly as in FIG. 11 illustrating the nozzle disconnected from the elbow.
Figure 12:
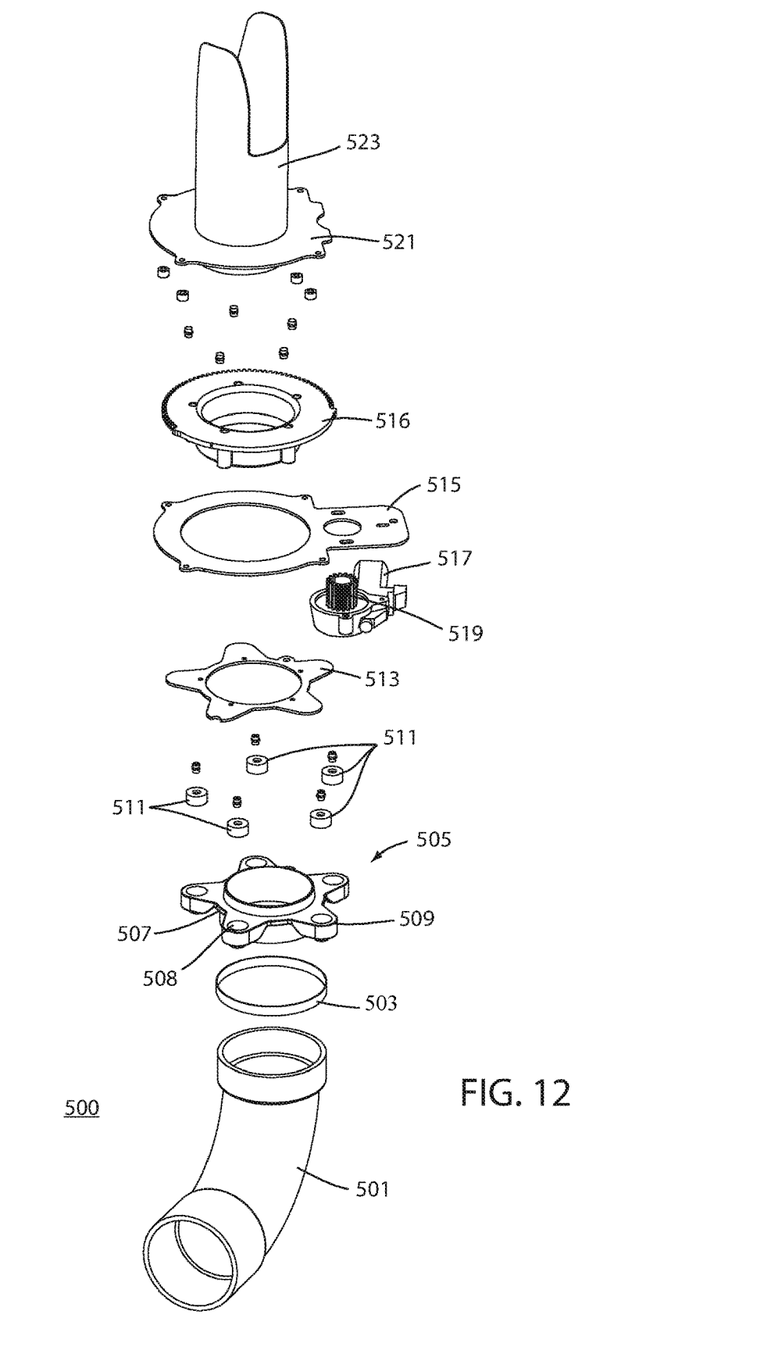
FIG. 12 is an exploded view illustrating the breakaway coupling assembly shown in FIG. 10.

FIG. 11 is a perspective view of the breakaway nozzle coupling assembly as in FIG. 10 illustrating the elbow 401 disconnected from inlet tube 403. FIG. 12 illustrates how the breakaway coupling assembly operates to quickly separate the elbow if a sufficient amount of force is a laterally applied to the elbow. The breakaway coupling assembly includes an upper plate 405 attached to the distal end of the inlet tube 403 and a lower plate 407 attached to the proximal end of the elbow 401. The lower plate 407 is formed in a star-like shape allowing it to house one or more mechanical fasteners 409. For example, if the fastener were a single circular magnetic ring, the fastener 409 is attached around the perimeter of the lower plate. When engaged with the upper plate 405, the magnet will allow the elbow 401 to be quickly disconnected from the inlet tube 403 when a predetermined amount of force is exceeded. Those skilled in the art will recognize the mechanical fasteners 409 create a mechanical bond type attachment and may include but are not limited to screws, pins, snaps, rivets, magnets or hook and loop type materials.

FIG. 12 is an exploded view illustrating the breakaway coupling nozzle assembly shown in FIG. 10 and FIG. 11. The breakaway coupling assembly 500 includes an elbow 401 for changing the airflow from the blower by approximately 90 degrees. A band 503 works with the elbow 501 to tightly fit a lower plate 505 to the elbow 501. The lower plate 505 includes a circular body 507 that is substantially star shaped. The body includes one or more arms 509 that extend about the perimeter of the body 507. A pilot seal or guide 508 includes a circular ridge for allowing the operator to easily mate the opening in the lower plate 505 inside the aperture of the upper plate 513. As described herein, each arm can include one or more fastening devices 511 such as a pin or magnet that will mate with a corresponding fastener on the upper breakaway coupling 513. The upper plate 513 is also a circular shaped similar in size to the lower plate 505. The upper plate 513 connects to a lower mount 515 using a series of bosses and screws that extend around the perimeter of the upper plate 513. Both the upper plate 513 and lower plate 505 are configured to be mated and/or frictionally engaged together across their respective surfaces that face one another. Those skilled in the art will recognize that when the upper plate 513 and lower plate 505 are mated together, this provides a stable platform for the elbow to operate until adequate lateral force is applied to break apart and/or release the upper plate 513 from the lower plate 505.

As described herein, the breakaway coupling 500 further includes a lower mount 515 that is used in combination with a motor 517 and pinion 519 to rotate gear 516. This in-turn rotates the elbow and breakaway coupling mount allowing the direction of the blowing air to be controlled through an arcing motion or movement. Finally, a weldment 521 operates to orient and hold the inlet tube 532 that connects to the blower housing (not shown) for directing the blowing air towards the elbow 501.

Figure 13:
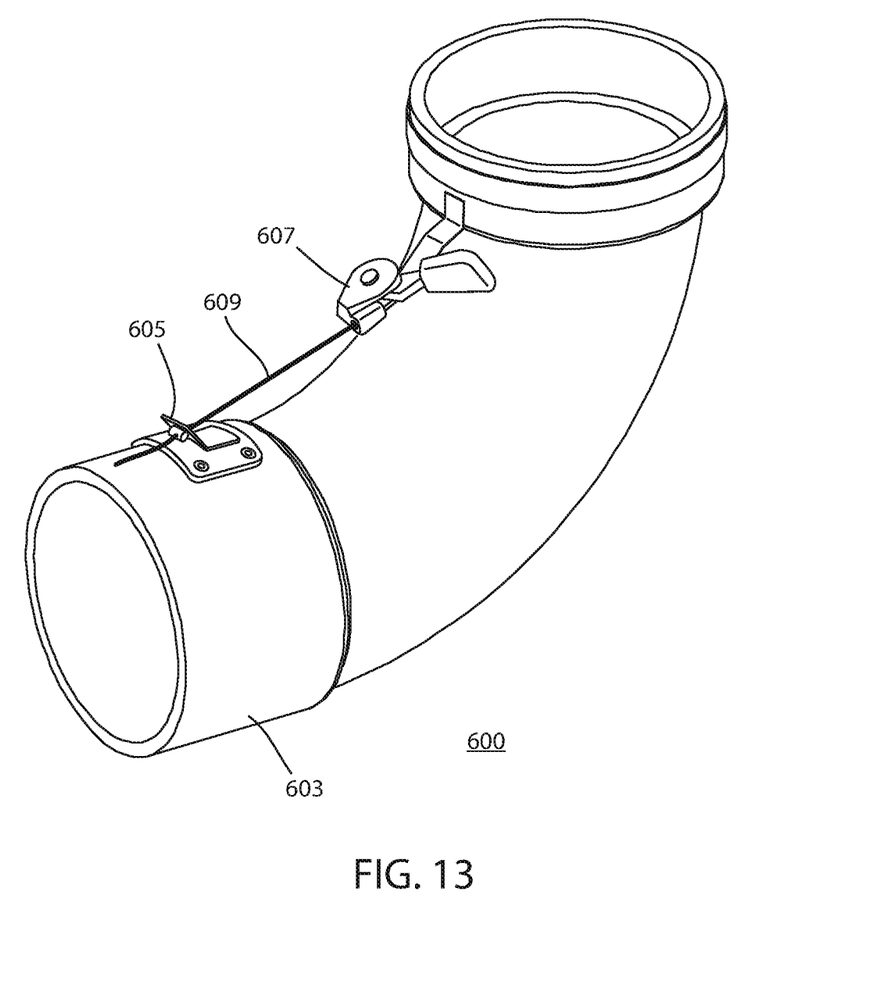
FIG. 13 is a perspective view showing a tensioner assembly.

FIG. 13 is a perspective view illustrating a tensioner assembly. When needed, the tensioner assembly 600 works to provide rigidity between the elbow 601 and the tip 603. Since the tip 603 is typically a soft, bendable plastic material, air blowing though the material can deform its shape. Once distorted, this allows the air to blow in an unintended or undesired direction because of the forces provided by the blowing air. In order to combat those forces, the tensioner assembly 600 includes a tie 605 that connects to an upper section of the tip 603. A wire or cable 609 extends between the tie 605 and tensioner 607 where the tensioner 607 can be ratcheted or engaged with the cable 609 for providing a predetermined amount of tension on the cable 609. If rigidity is desired, tension is facilitated through the use of a ratchet arm that uses an internal gear to grip the cable. This ratcheting action allows the cable to be set to a desired tension. The tensioning force of the cable 609 works to prevent the tip 603 from easily moving or distorting its shape when forces from high velocity air, coming from the powerful motor, are directed though the tip 603. Those skilled in the art will recognize although mechanical solution is provided here, other solutions using electric, electro-mechanical or mechanical components are also possible using an electric motor or the like to mechanically ratchet the cable to a desired tension.

Figure 14:
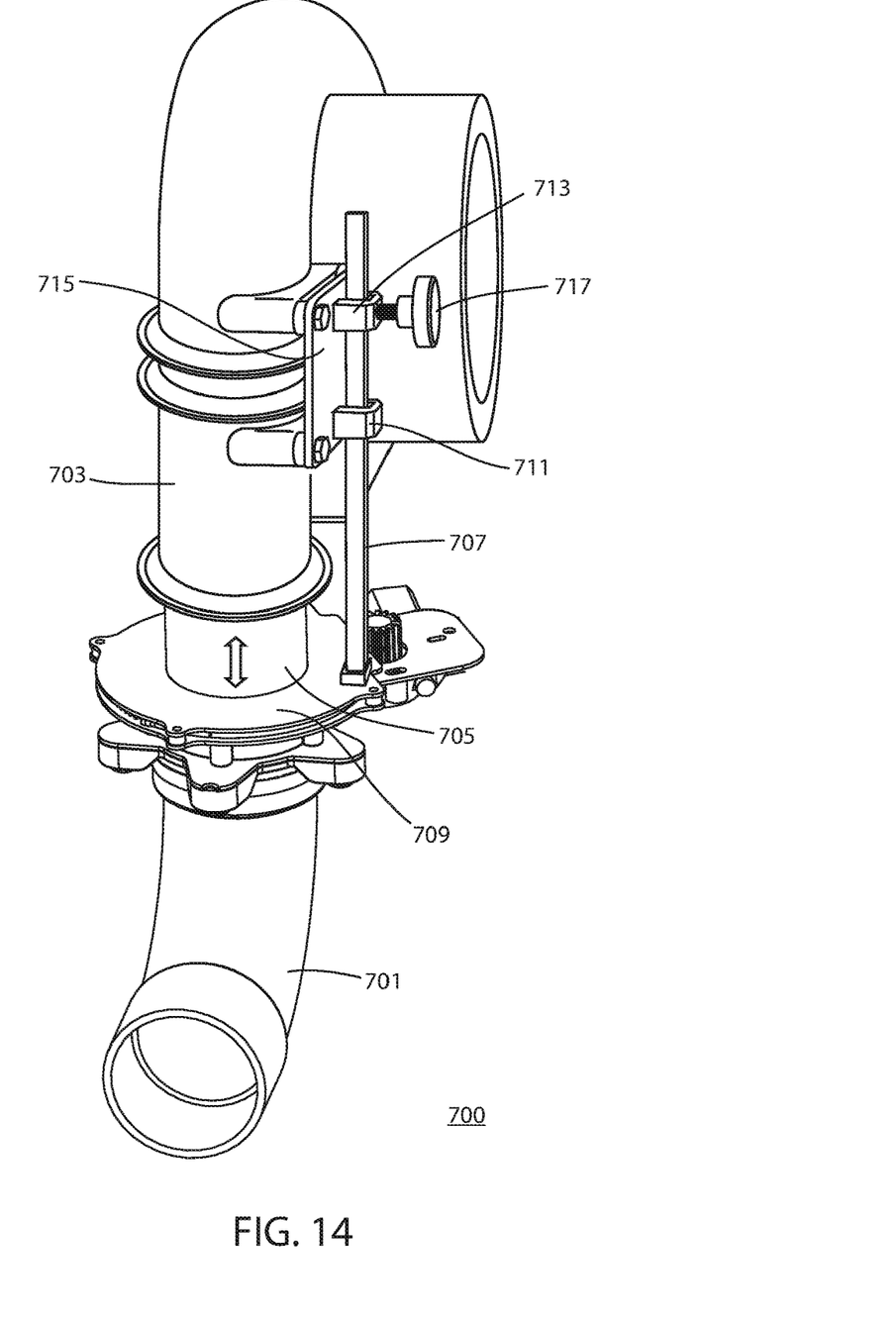
FIG. 14 is a perspective view showing the height adjustment assembly.

FIG. 14 is a perspective view showing the height adjustment assembly. The height adjustment assembly 700 works to change and control the height of the elbow 701 and accompanying nozzle above ground height. The height is adjustable between the lower mount 701 and inlet tube portion 703. An inlet tube extension 705 is inserted in the input tube portion 703. The length of the inlet tube extension 705 using an adjustment member 707. The adjustment member 707 is fixedly attached at one end to the lower mount 709. The adjustment member 707 is configured to extend along the length of the tube portion 703. The adjustment member 707 extends through a first guide 711 and a second guide 713. The first guide 711 and second bracket 713 are both connected to bracket 715. As the adjustment member 707 passes through the first bracket 711 and second bracket 713, the adjustment member is held into a substantially fixed position. The second bracket 715 include a thumb screw 717 that frictionally engages with the side of the adjustment member 707 so to hold it into a fixed position or length. In use, once the height if the elbow 701 is adjusted to a predetermined level above ground, the thumb screw 717 is tightened to hold the height adjustment assembly 700 into a fixed position.

Thus, the present invention is directed to embodiments of a horizontally adjustable nozzle assembly for use with a landscape blower that includes an elbow and an electric motor. A gear assembly is operated by the electric motor where the gear assembly connects to the nozzle assembly for rotating the elbow within at least a 160-degree range but less than a full 360 degrees of rotation. The gear assembly includes a pinion gear rotated by the electric motor such that the pinion gear engages with a flat gear for rotation of the elbow in a user controllable motion. The gear assembly includes both breakaway coupling, tensioner assembly and height adjustment assembly.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A landscaping blower nozzle assembly comprising:
    an inlet section for allowing air into the assembly from a blower motor;
    an elbow section having a nozzle; and
    wherein the elbow section includes a breakaway magnetic coupler for detaching the elbow section from the inlet section when a predetermined amount of force is applied to the elbow section.

2. A landscaping blower nozzle assembly as in claim 1, further comprising:
    a user controllable rotation motor for rotating the elbow section.

3. A landscaping blower nozzle assembly as in claim 1, wherein the breakaway magnetic coupler includes an upper plate and lower plate that are attached using a plurality of fasteners.

4. A landscaping blower nozzle assembly as in claim 3, wherein the breakaway magnetic coupler further includes a tapered piloting seal for aligning the upper plate and lower plate.

5. A landscaping blower nozzle assembly as in claim 3, wherein the plurality of fasteners are spaced about the breakaway coupler.

6. A landscaping blower nozzle assembly as in claim 3, wherein the plurality of fasteners provide an adhesive force to maintain a sealed bond between the upper plate and lower plate.

7. A landscaping blower nozzle assembly as in claim 1, wherein the inlet section includes a tensioner assembly for adjusting the tension of a nozzle base to the elbow section.

8. A nozzle assembly for use with a landscape blower comprising:
    an inlet section;
    an elbow having a tip and connecting to the inlet section;
    a tensioner assembly for adjusting the tension of a cable between the elbow and tip to prevent movement of the tip during use; and
    wherein the elbow includes a magnetic coupler for enabling movement of the elbow when a predetermined amount of force is applied to the elbow section.

9. A nozzle assembly as in claim 8, wherein the tensioner assembly includes a ratcheting gear for controlling the tension of the cable.

10. A nozzle assembly as in claim 8, wherein the ratcheting gear is controlled using a ratchet arm for controlling position of the ratcheting gear.

11. A nozzle assembly as in claim 8, wherein the elbow can be rotated in an arc using an electric motor and at least one gear.

12. A landscaping blower nozzle assembly comprising:
    an inlet section for receiving high velocity air from a gas motor;
    an elbow connected to the inlet section;
    a breakaway coupler having a upper plate configured with the elbow and a lower plate configured with the inlet section; and
    a tensioner for adjusting tension of a cable fastened across the elbow for preventing the elbow from distorting its shape during use.

13. A landscaping blower nozzle assembly as in claim 12, wherein the breakaway coupler includes a first mount and second mount that are joined using a plurality of fasteners.

14. A landscaping blower nozzle assembly as in claim 12, wherein the tensioner includes a ratcheting gear for holding the tension of the cable in a fixed position.

15. A landscaping blower nozzle assembly as in claim 12, wherein the tensioner includes a ratchet arm for adjusting tension of the cable.

16. A landscaping blower nozzle assembly as in claim 12, wherein the breakaway coupler includes a upper plate configured with the inlet section and lower plate configured with the elbow such that the upper plate and lower plate are joined using a plurality of fasteners.

17. A landscaping blower nozzle assembly as in claim 16, wherein the plurality of fasteners include at least one magnet.

18. A landscaping blower nozzle assembly as in claim 12, wherein the elbow moves through an arc of motion using an electric motor and at least one gear.

19. A landscaping blower nozzle assembly as in claim 12, wherein the elbow acts as nozzle for directing air to a desired location.

* * * * *